J. URBANEK.
NON-SKIDDING ATTACHMENT FOR WHEELS.
APPLICATION FILED FEB. 4, 1915.
1,136,298. Patented Apr. 20, 1915.
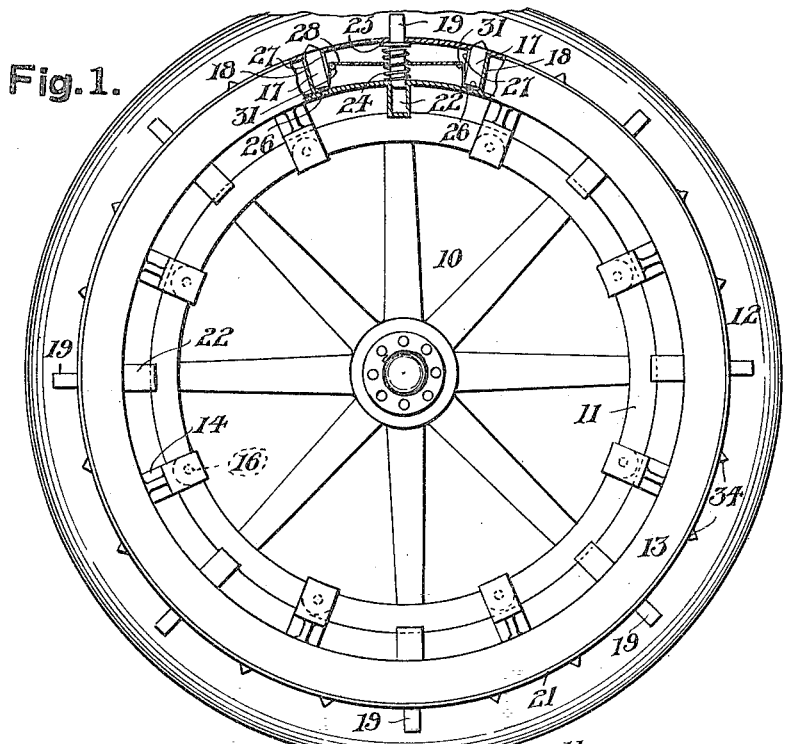
Fig. 1.
Fig. 2.
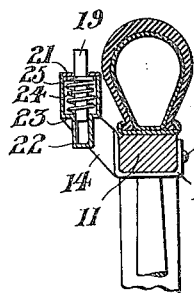
Fig. 3.
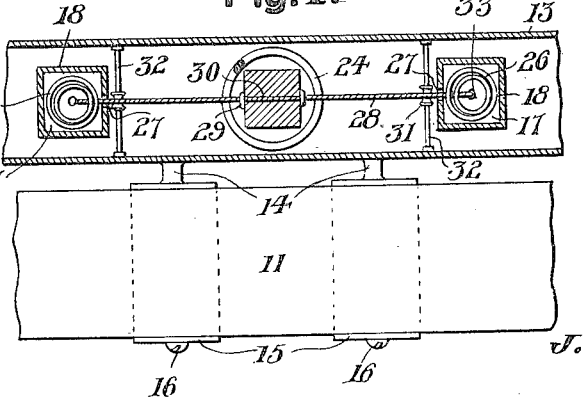
Fig. 4.
Witnesses
L. Z. Torosiewicz
T. W. Bryant
Inventor
J. Urbanek
By A. M. Wilson
Attorney
THE NORRIS PETERS CO., PHOTO-LITHO., WASHINGTON, D. C.

UNITED STATES PATENT OFFICE.

JOSEPH URBANEK, OF CHICAGO, ILLINOIS.

NON-SKIDDING ATTACHMENT FOR WHEELS.

1,136,298.   Specification of Letters Patent.   Patented Apr. 20, 1915.

Application filed February 4, 1915. Serial No. 6,097.

*To all whom it may concern:*

Be it known that I, JOSEPH URBANEK, a subject of the Emperor of Austria-Hungary, residing at Chicago, in the county of Cook and State of Illinois, have invented certain new and useful Improvements in Non-Skidding Attachments for Wheels, of which the following is a specification.

This invention relates to new and useful improvements in non-skidding attachment for wheels.

The primary object of the invention is the provision of an auxiliary wheel or casing adapted to be removably secured at either or both sides of a vehicle wheel and provided with automatically projected ground engaging calks.

A still further object is to provide an auxiliary wheel provided with radially disposed ground engaging calks capable of being projected and retracted and having means for automatically projecting the said calks as the latter are brought into operative position adjacent the road bed.

A still further object is to provide an annular member as an attachment to a vehicle wheel and having automatically shiftable ground engaging calks and adapted for preventing any side slipping of the wheel as well as to afford additional traction means between the wheel and the road bed.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a side elevation of a wheel provided with one of the present devices attached thereto and having parts broken away. Fig. 2 is a detail view of a portion thereof and partly in section with the elements shown in their operative road bed engaging positions. Fig. 3 is a detail, reduced, radial, transverse sectional view through the outer portion of the construction shown in Fig. 1, and Fig. 4 is an enlarged detail view partially in section taken upon line IV—IV of Fig. 2.

Referring more in detail to the drawings, the present device comprising a non-skid attachment is herein illustrated in connection with a vehicle 10 provided with the usual felly 11 and pneumatic tire 12.

There is provided a mounting means for the operative elements of the device consisting of an annular or wheel form of hollow casing 13 which is rectangular in cross section, the same being rigidly attached to the wheel felly 11 by means of laterally projecting securing brackets 14 having straps 15 at their free ends for fitting over the felly and being secured thereto in any desired manner, as by means of the screws 16.

The casing 13 is provided throughout its circumferential length with sharpened radially positioned ground engaging calks 17 which are arranged in pairs, spaced apart, and slidably mounted within radial transverse tubes 18 carried by the said casing, the said tubes and calks being rectangular in cross section, as best illustrated in Fig. 4.

An abutment or pin 19 is radially positioned centrally between the calks of each pair thereof and is slidably positioned through a peripheral rectangular perforation 20 of the outer side or face 21 of the said casing, while the inner end of each abutment 19 is slidably received within an inwardly projecting radial socket 22 carried by the inner side wall 23 of the casing and being rectangular in cross section.

An expansion spring 24 is provided encircling each of the abutments 19 for normally projecting such abutment as illustrated in Fig. 1 and bearing against the inner face of the casing wall 23 and a surrounding collar 25 secured to the abutment. A retractile spring 26 is provided within each of the tubes 18 and is designed for normally retracting the calks 17 being connected between the inner ends of the said calks and the inner faces of the casing wall 23.

The adjacent inner sides of the tubes 18 are provided with longitudinal slots 27 and a cord 28 is secured to the abutment 20, as at 29, and passes through the side abutment as at 30 and has its outer opposite ends passing through the adjacent slots 27 and thence over pulleys or spools 31 carried by transverse rods 32 adjacent the said slots 20, the opposite ends 33 of the cord being fixedly secured to the inner ends of the calks 17 substantially centrally thereof.

The complete operation of the device will be readily apparent from the present detailed description thereof and the manner in which the calks are automatically projected will be evident. With the calks and their intermediate abutments normally positioned by means of their respective springs in the manner illustrated in Fig. 1, the abutment 19 will be projected by its spring 24 while the calks 17 will be retracted by their springs 27, it being noted that the calks are provided with sharpened or pointed outer ends 34 for engaging the road bed while the abutments are preferably squared at their outer ends for preventing the abutments from entering the road bed and affording the greatest possible engaging surface for imparting the operative inner impulse to the abutment.

When the outer end of the abutment 19 engages the road bed as 35 illustrated in Fig. 2, the abutment will be retracted against the action of the spring 24 and will carry the central portion of the connecting cord 28 inwardly, thus exerting a pulling action upon the opposite ends of the cord and thus shifting the cord over the spools 31 and partially withdrawing or projecting the slidable calks 17, to which the said opposite ends of the cord are secured. It will thus be seen that as each successive abutment is brought into engagement with the road bed, the pair of calks operatively attached thereto will be automatically projected for engaging the road bed, while upon a releasing of the abutment by its disengagement with the road bed during the travel of the wheel, the spring 24 will again normally project the abutment while the springs 26 will return the calks inwardly to their retracted inoperative positions.

It will of course be apparent that the device may be attached in any desired manner to a vehicle wheel and upon either the inner or the outer side thereof while if desired, one of the devices may be attached to both the inner and outer sides of the wheel although as will be obvious, to position the device upon the inner side of the wheel it will be necessary to remove the wheel from the axle or the spindle upon which the same is mounted.

While the form of the invention herein shown and described is what is believed to be the preferred embodiment thereof, it is nevertheless to be understood that minor changes may be made in the form proportion and details of construction without departing from the spirit and scope of the invention as set forth in the appended claims.

What I claim as new is:—

1. A non-skid attachment comprising a tubular casing, projectable normally retracted radially positioned calks carried thereby, a normally projected abutment slidably mounted and radially positioned intermediate the said calks and connecting means operatively positioned between the said abutment and calks.

2. A device of the class described comprising an annular tubular casing, radially positioned tubes carried thereby, normally retracted calks slidably mounted within the said tubes and having their outer ends projecting outwardly of the said casing, a normally projected abutment slidably carried by the said casing transversely thereof and positioned between two of the said calks, and an operative connecting cord between the said abutment and the adjacent calks.

3. A device of the class described comprising an annular tubular casing, radially positioned tubes carried thereby, normally retracted calks slidably mounted within the said tubes and having their outer ends projecting outwardly of the said casing, a normally projected abutment slidably carried by the said casing transversely thereof and positioned between two of the said calks, the said tubes having longitudinal slots in their adjacent sides, transverse rods carried by the said casing between the said tubes, spools upon said rods positioned adjacent the said slots, a cord centrally secured to the said abutment and passing over the said spools and through the said slots and having its opposite ends securely attached to the inner ends of the said calks.

4. A non-skid attachment for vehicle wheels comprising an annular tubular casing rectangular in cross section, fully engaging mounting brackets laterally secured to the said casing, radially positioned rectangular tubes provided in pairs and extending through the said casing, the tubes of each pair having longitudinal slots through their adjacent sides, calks rectangular in cross section slidably mounted within the said tubes and extending through the peripheral side of the casing, retractile springs in the said tubes connected between the inner wall of the casing and the inner ends of the calks, the said casing provided with inwardly projecting sockets between each pair of tubes, an abutment radially positioned and slidably mounted through the said casing and within the said socket, an expansion spring surrounding each abutment and having its ends attached between the abutment and the inner wall of the casing, transverse rods within said casing positioned between each abutment and the adjacent tube, a spool upon each of said rods adjacent the slot of the neighboring tube, an operating cord centrally secured through the said abutment and oppositely extending over the said spools and through the said slots and having its opposite ends fixed to the inner ends of the said calks.

In testimony whereof I affix my signature in presence of two witnesses.

JOSEPH URBANEK.

Witnesses:
 PAUL FRYEZCK,
 FRANK JASKIERNY.

Copies of this patent may be obtained for five cents each, by addressing the "Commissioner of Patents, Washington, D. C."